(12) United States Patent
Goldenberg

(10) Patent No.: US 8,256,385 B2
(45) Date of Patent: Sep. 4, 2012

(54) DUAL RETRACTABLE PET LEASH WITH ABILITY TO STOP PETS INDIVIDUALLY

(76) Inventor: Cade H. Goldenberg, Washington, DC (US)

(*) Notice: Subject to any disclaimer, the term of this patent is extended or adjusted under 35 U.S.C. 154(b) by 0 days.

(21) Appl. No.: 12/928,639

(22) Filed: Dec. 15, 2010

(65) Prior Publication Data

US 2011/0180017 A1    Jul. 28, 2011

Related U.S. Application Data

(60) Provisional application No. 61/282,106, filed on Dec. 16, 2009.

(51) Int. Cl.
*A01K 27/00* (2006.01)
(52) U.S. Cl. ........................................................ 119/796
(58) Field of Classification Search .................. 119/792, 119/793, 794, 795, 796, 797, 798; 242/388, 242/388.3, 388.6, 388.7
See application file for complete search history.

(56) References Cited

U.S. PATENT DOCUMENTS

| | | | | |
|---|---|---|---|---|
| 6,792,893 | B1* | 9/2004 | Quintero et al. | 119/796 |
| 7,207,296 | B2* | 4/2007 | DiDonato | 119/796 |
| 7,455,034 | B2* | 11/2008 | DiDonato | 119/796 |
| 7,559,292 | B2* | 7/2009 | Blandford | 119/796 |
| 7,980,202 | B2* | 7/2011 | Bentz et al. | 119/796 |
| 2011/0067649 | A1* | 3/2011 | O'Brien et al. | 119/796 |

* cited by examiner

*Primary Examiner* — T. Nguyen
(74) *Attorney, Agent, or Firm* — Michael J. Foycik, Jr.

(57) ABSTRACT

A twin pet leash prevents tangling by permitting the reel portion to rotate relative to the handle portion, and features individually controllable leash stop mechanisms. Even while an individual leash is stopped, the reel portion can rotate relative to the handle portion so that tangling of the pet leashes is avoided. The leash handle portion has two triggers which are color coded to match the color of the leash, so that a user can readily identify which of the two leashes are to be stopped. Either or both of the leashes can be stopped or released, without interfering with the operation of the other one of the leashes.

2 Claims, 8 Drawing Sheets

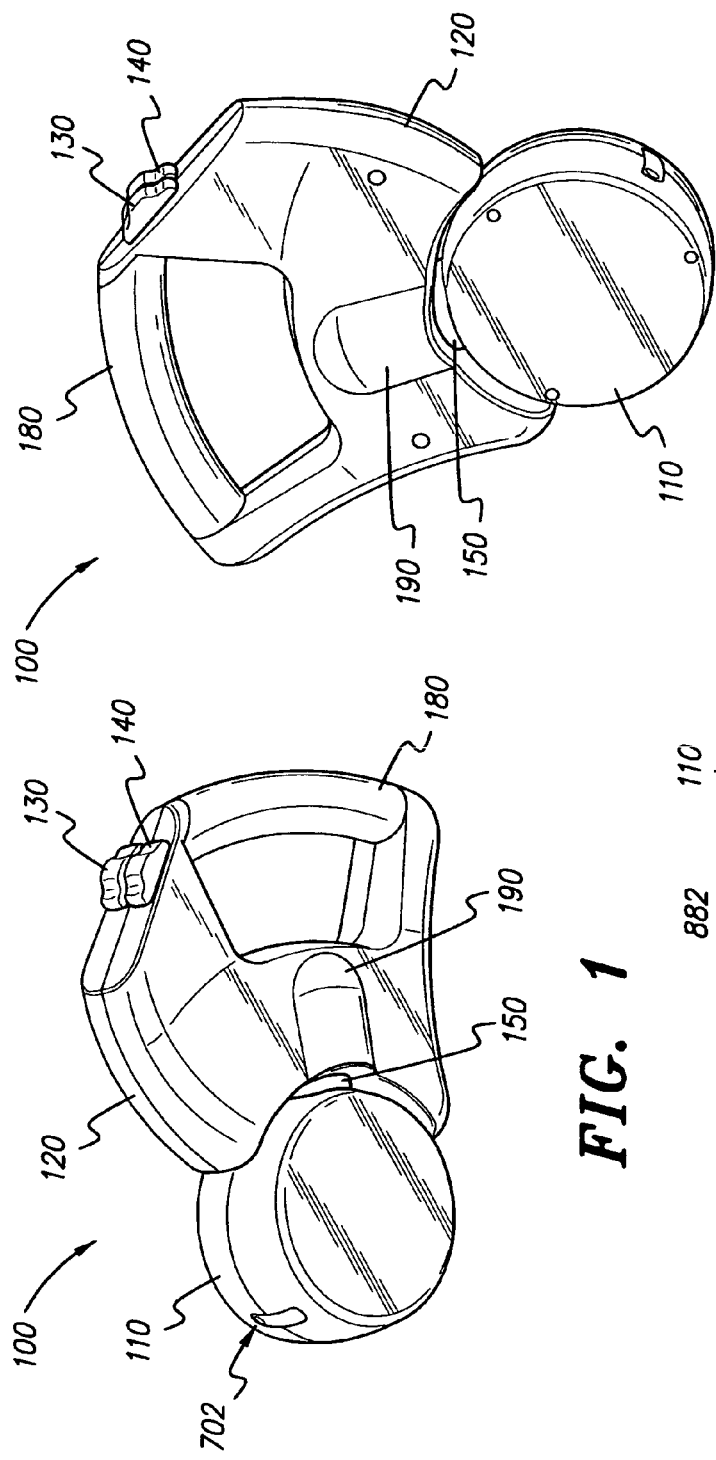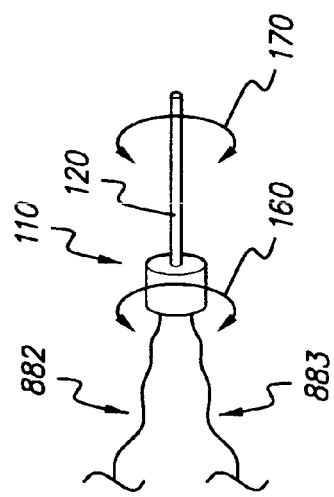

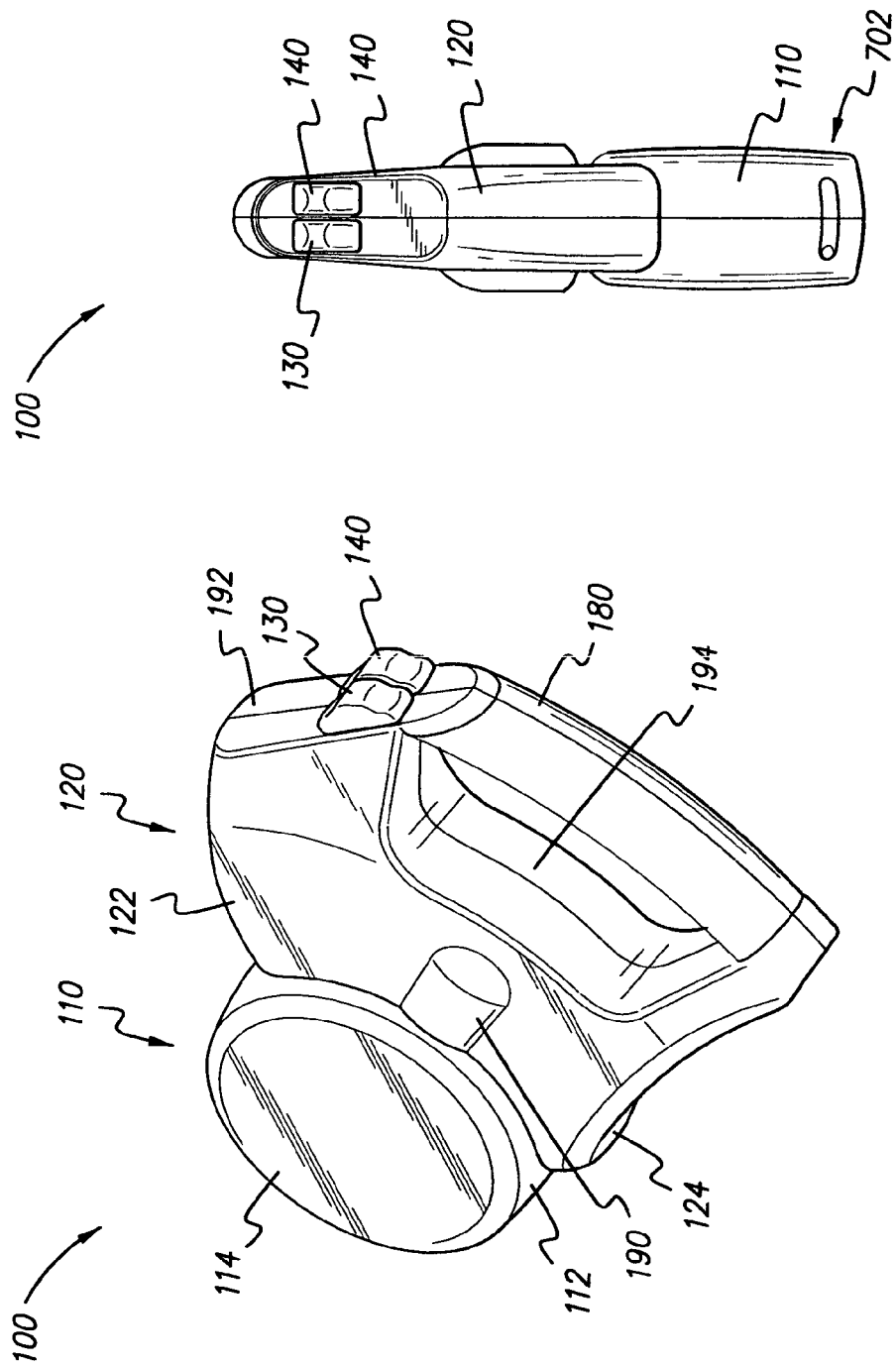

US 8,256,385 B2

DUAL RETRACTABLE PET LEASH WITH ABILITY TO STOP PETS INDIVIDUALLY

CROSS REFERENCE TO RELATED APPLICATIONS

This application claims the priority of Provisional Application No. 61/282,106 filed on Dec. 16, 2009, inventor Cade H. Goldenberg, entitled "Dual retractable pet leash with ability to stop pets individually." The entire disclosure of this provisional patent application is hereby incorporated by reference thereto, in its entirety.

STATEMENT REGARDING FEDERALLY SPONSORED RESEARCH OR DEVELOPMENT

Not applicable.

FIELD OF THE INVENTION

The present invention relates generally to twin pet leashes. In this invention, the twin pet leash prevents tangling by permitting the reel portion to rotate relative to the handle portion, and features individually controllable leash stop mechanisms.

BACKGROUND OF THE INVENTION

Retractable dog and pet leashes are well known in the prior art. Such machines usually work by having a single reel with a single trigger mechanism for controlling the stopping of the reel. Single leash units having two leashes are known, for walking two pets at the same time. When pets pull on their leash, unwinding of a reel occurs; however sometimes the leash must be stopped from unwinding further, for example to prevent a pet from running into traffic or to prevent the pet from approaching another animal or human.

However, the prior art leashes are subject to tangling, and there is no way to stop a single one of the two leashes from unreeling further without also stopping the other leash. Further, in the prior art, there is no way of maintaining an anti-tangling function while one or both of the leashes are stopped.

There is a need for an apparatus or device for providing a twin pet leash that is retractable and that prevents tangling of the leashes, while permitting individual stopping of either one of the leashes without interfering with the operation of the other one of the leashes and without interfering with the function of the leash preventing tangling of the two leashes.

It is accordingly a problem in the prior art to provide a twin pet leash that is retractable and that prevents tangling of the leashes, while permitting individual stopping of either one of the leashes without interfering with the operation of the other one of the leashes and without interfering with the function of the leash preventing tangling of the two leashes.

SUMMARY OF THE INVENTION

From the foregoing, it is seen that it is a problem in the art to provide a device meeting the above requirements.

According to the present invention, a device is provided which meets the aforementioned requirements and needs in the prior art. Specifically, the device according to the present invention provides a twin pet leash that prevents tangling by permitting the reel portion to rotate relative to the handle portion, and features individually controllable leash stop mechanisms.

The twin pet leash prevents tangling by permitting the reel portion to rotate relative to the handle portion, and features individually controllable leash stop mechanisms. Even while an individual leash is stopped, the reel portion can rotate relative to the handle portion so that tangling of the pet leashes is avoided. The leash handle portion has two triggers which are color coded to match the color of the leash, so that a user can readily identify which of the two leashes are to be stopped. Either or both of the leashes can be stopped or released, without interfering with the operation of the other one of the leashes.

Other objects and advantages of the present invention will be more readily apparent from the following detailed description when read in conjunction with the accompanying drawings.

BRIEF DESCRIPTION OF THE DRAWINGS

FIG. 1 is a perspective view of a dual retractable pet leash with ability to stop pets individually, according to the present invention.

FIG. 2 is a perspective view from the side of the pet leash of FIG. 1.

FIG. 3 is a simplified schematic view showing the relative rotation of the two main parts of the leash of FIG. 1, with the two main parts being shown at a ninety degree angle to each other.

FIG. 4 is a perspective view of the leash of FIG. 1 showing the trigger elements and handle portion and showing the contours of the other parts.

FIG. 5 is an end view of the leash of FIG. 1, showing the trigger portion wherein the handle portion is uppermost and the reel portion is lowermost.

DETAILED DESCRIPTION OF THE INVENTION

Figure 6:
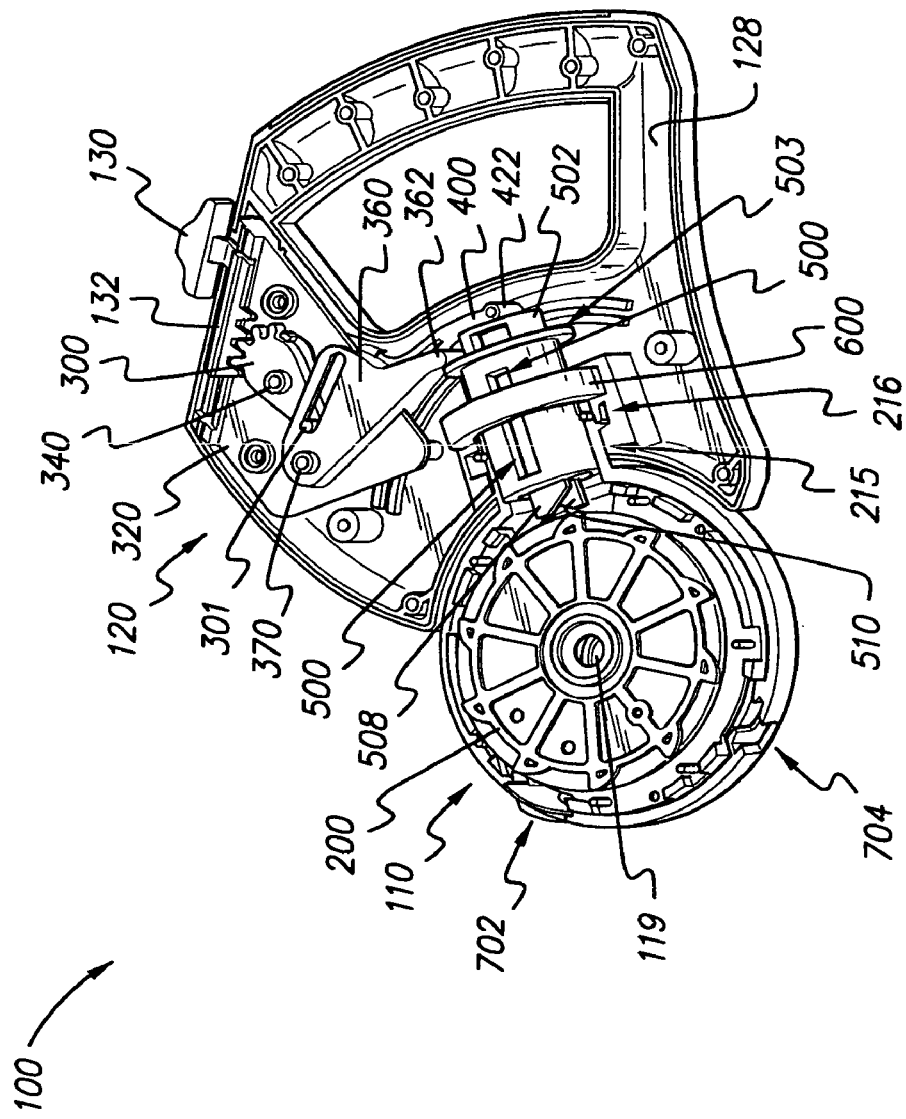
FIG. 6 is an elevational view of the interior portion of the leash of FIG. 1, showing the main operating parts and the reels.

FIG. 1 is a perspective view of a dual retractable pet leash 100 which has the ability to stop unreeling of each one of the leashes individually as well as simultaneously. The leash 100 has a reel portion 110 and a handle portion 120. The handle portion 120 has a grip portion 180, and is connected to the reel portion 110 at a joint 150. A bulge 190 contains the joint portion shown in more detail in FIGS. 6-12. The handle portion 120 carries two trigger members 130 and 140, which separately brake the individual leashes. The reel portion 110 is rotatable continuously relative to the handle portion 120 in either rotational direction about the longitudinal axis of the leash 100 containing the connecting portion 150. Additionally an aperture 702 is shown in the reel portion 110, where one of the two leashes can exit the reel portion 110. The advantages and uses of the leash 100 are as discussed further below.

Single retractable leash devices usually work by having a single reel with a single trigger mechanism for controlling the stopping of the reel. Single leash units having two leashes are known, for walking two pets at the same time. When pets pull on their leash, unwinding of a reel occurs; however sometimes the leash must be stopped from unwinding further, for example to prevent a pet from running into traffic or to prevent the pet from approaching another animal or human. When two leashes are used in such devices, both leashes are subject to tangling with one another due to movement of the pets or of the owner, or both. Additionally, the leashes must be capable of being stopped, both for the safety of the pets and control of the pets in general.

However, in the known types of prior art dual leashes, most are subject to tangling, and there is no way to stop a single one of the two leashes from unreeling further without also stopping the other leash. This dual stopping action could make it difficult to control both pets separately, and it may not be desirable for both pets to be stopped closely together on a short leash length. Further, as discussed above, in the prior art there is no way of maintaining an anti-tangling function while one or both of the leashes are stopped.

There is a need for the leash 100 of the present invention which provides a twin pet leash that is retractable and that prevents tangling of the leashes, while permitting individual stopping of either one of the leashes without interfering with the operation of the other one of the leashes and without interfering with the function of the leash preventing tangling of the two leashes.

The leash 100 according to the present invention provides a twin pet leash that prevents tangling by permitting the reel portion 110 to rotate relative to the handle portion 120, and features individually controllable leash stop mechanisms (shown in FIGS. 6-12) actuated by trigger members 130 and 140. Even while an individual leash is stopped, the reel portion 110 can rotate relative to the handle portion 120 so that tangling of the pet leashes is avoided. The leash handle portion 120 has the two triggers 130 and 140 which are preferably color coded to match the color of the corresponding leash that is controls, so that a user can readily identify which of the two leashes are to be stopped. Either or both of the leashes can be stopped or released, without interfering with the operation of the other one of the leashes.

FIG. 2 is a perspective view from the side of the pet leash 100 of FIG. 1. The elements shown in the figure are as described hereinabove with regard to FIG. 1.

FIG. 3 is a simplified schematic view showing the relative rotation of the two main parts of the leash of FIG. 1, namely the reel portion 110 and the handle portion 120 with the two main parts 110 and 120 being shown at a ninety degree angle to each other. A double-headed arrow 160 shows the rotational direction for rotary movement of the reel portion 110. The handle portion 120 can rotate independently as well in the rotational direction shown by the double headed arrow 170. The reel portion 110 is shown with two leashes 882 and 883 extending therefrom. It will be understood that FIG. 3 is merely schematic and greatly simplified for purposes of clarity. It is noted that the reel portion 110 can rotate continuously, with no limit on the number of rotations, without disrupting the ability of the trigger members 130 and 140 to stop the individual leashes; this is shown with respect to FIGS. 6-12 discussed hereunder.

FIG. 4 is a perspective view of the leash 100 of FIG. 1 showing the trigger elements 130 and 140, and the handle portion 120 more clearly, and also showing the contours of the other parts. The elements shown in the figure are as described hereinabove with regard to FIG. 1. Here, a flat surface 114 and a curved periphery 112 of the reel portion 110 is indicated, as well as a flat top wall 112 and a side wall 124 of the handle portion 120. A side wall 192 of the handle portion 120 carries the trigger portions 130 and 140.

FIG. 5 is an end view of the leash of FIG. 1, showing the trigger portion 192 wherein the handle portion 120 is disposed in an uppermost position and the reel portion 110 is lowermost. The elements shown in the figure are as described hereinabove with regard to FIG. 1.

FIG. 6 is an elevational view of the interior portion of the leash 100 of FIG. 1, showing the main operating parts and the reels, which are described in detail as follows. The trigger 130 has a cogged arm 132 which engages with the teeth of a pivoting actuator 300 which pivots about a post 340.

A support wall 320 is shown which supports the elements shown mounted thereon as described hereunder. The support wall 320 has similar elements mounted on the other side thereof for use with the trigger member 140 (not shown in FIG. 6). The actuator 300 has an end with a projecting pin 301 which engages a slot formed in a brake actuator 360. The actuator 360 is pivotably mounted about a pin 370 to cause movement of an actuator aim portion 362 into and out of engagement with an outer, annularly-shaped outer member 503 of a braking mechanism 500. Another actuator 400 is similarly mounted by similar elements (not shown) on the other side of the support wall 320, the actuator 400 having an extended arm portion 422, engages a central, cylindrically-shaped member 502 of the braking mechanism 500. The actuators 400 and 360 cause linear movement respectively of the elements 502 and 503 which cause braking of the reels in the manner discussed hereunder with respect to FIGS. 7-12 below.

The braking mechanism 500 is rotatably secured within a projecting portion 215 having grooves 216 for mounting the mechanism 500 for rotation with the reel portion 110. A bearing 600 is provided for smooth rotation relative to the handle portion 120. The cylindrical member 502 has a distal end 508 which selectively engages notches formed in a reel 200.

As seen in FIG. 6, the reel 200 is rotatable about a central portion 119 which in an assembled condition will be filled by a pin or post member to support rotation of the reel 200 thereabout. The annular portion 503 has a distal end 510 that stops the second reel 290 (shown in FIG. 7). In FIG. 6, the distal portions 508 and 510 are shown in the non-stopped condition. Also, the leash opening 702 is shown as well as a second leash opening 704, so that two separate leashes can extend from the reel portion 110.

Figure 12:
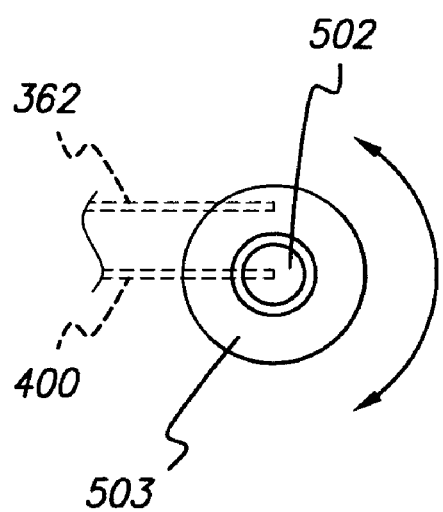
FIG. 12 is a schematic view as seen from the bottom of FIG. 11.

It is a very significant aspect of the present invention that, while the braking mechanism rotates with the reel portion 110, the actuator arms 360 and 400 do not rotate with the braking mechanism 500. Instead, they are positioned so that they simply slide relative to the surfaces with which they are engaged, without interfering with one another, as shown in FIG. 12 hereunder.

Figure 7:
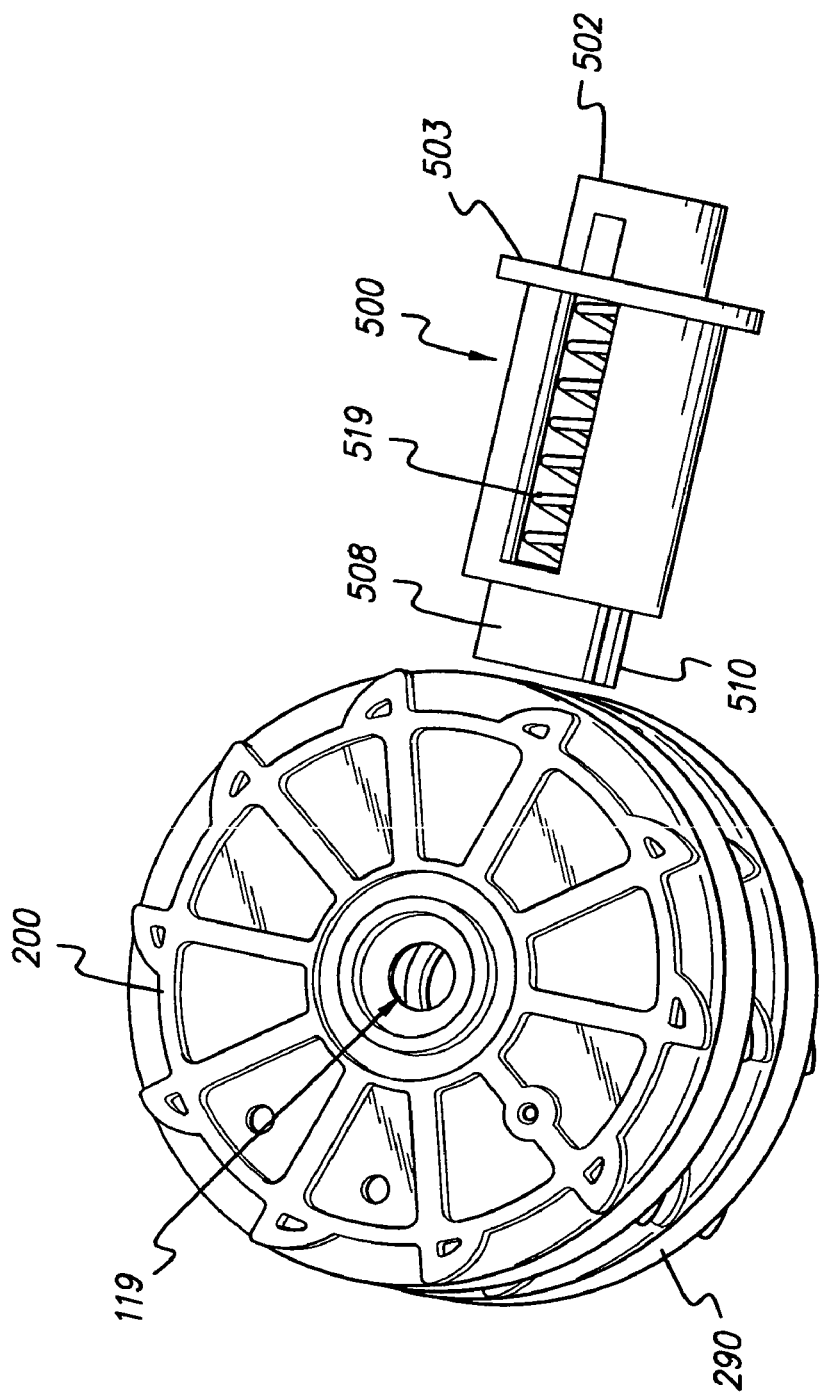
FIG. 7 is a schematic perspective view showing only the reel portion and the portion of the stopping mechanism which engages directly with the reel portion, of the leash of FIG. 1.

FIG. 7 is a schematic perspective view showing only the reels 200 and 290, and stopping mechanism 500. Here, the portion of the stopping mechanism which engages directly with the reel portions are the distal ends 508 and 510, as discussed hereinabove with regard to FIG. 6. A spring element 519 is shown which biases one of the members 502 and 503 into a non-braking position; this is shown in further detail with regard to FIG. 9 discussed below.

Figure 8:
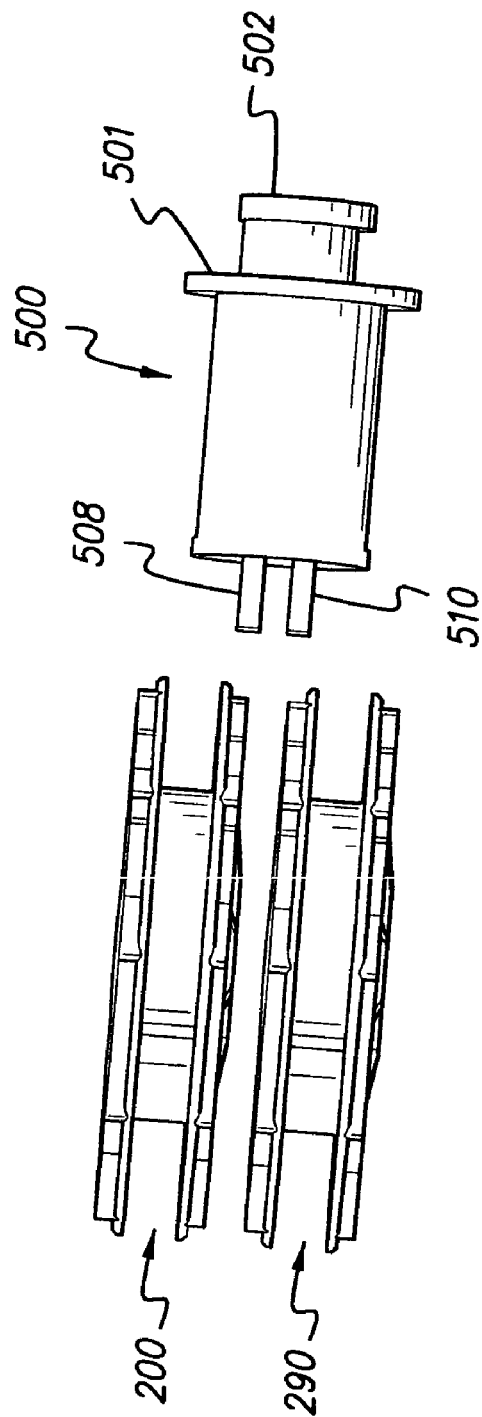
FIG. 8 is a schematic perspective view of the reel portion and stopping mechanism of FIG. 7 as viewed from below FIG. 7.

FIG. 8 is a schematic perspective view of the reels 200 and 290, and stopping mechanism 500 of FIG. 7, as viewed from below FIG. 7. The elements shown in this figure are as described hereinabove with regard to FIG. 7. The distal portion 508 engages notches in the reel 200 to stop it when moved toward the reel 200 and into engagement therewith. Similarly, the distal portion 510 engages notches in the reel 290 to stop it when moved toward the reel 290 and into engagement therewith.

Figure 9:
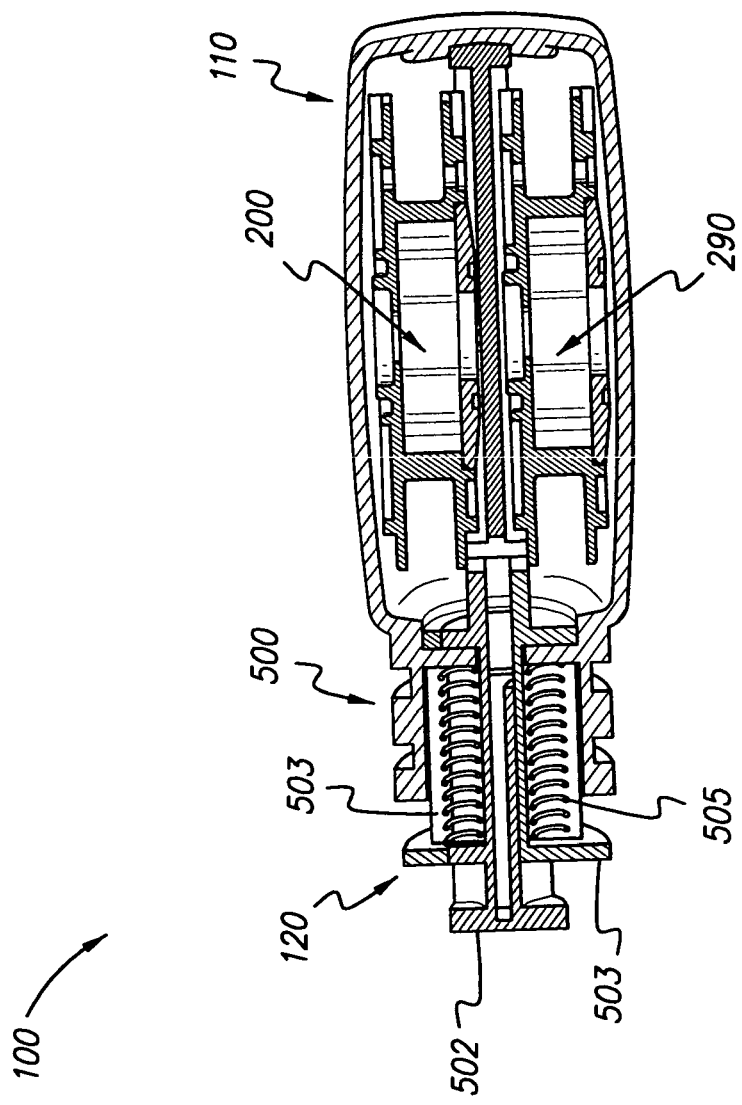
FIG. 9 is a side perspective view of the interior elements of the reel portion, showing the stopping mechanism and springs.

FIG. 9 is a side schematic perspective view of the interior elements of the reel portion 110, showing the stopping mechanism 500 and the spring 503 biasing the central member 502 to a non-engaged position, and another spring 505 biasing the outer cylindrical member 503 to a non-engaged position. The reels 200 and 290 are shown.

Figure 10:
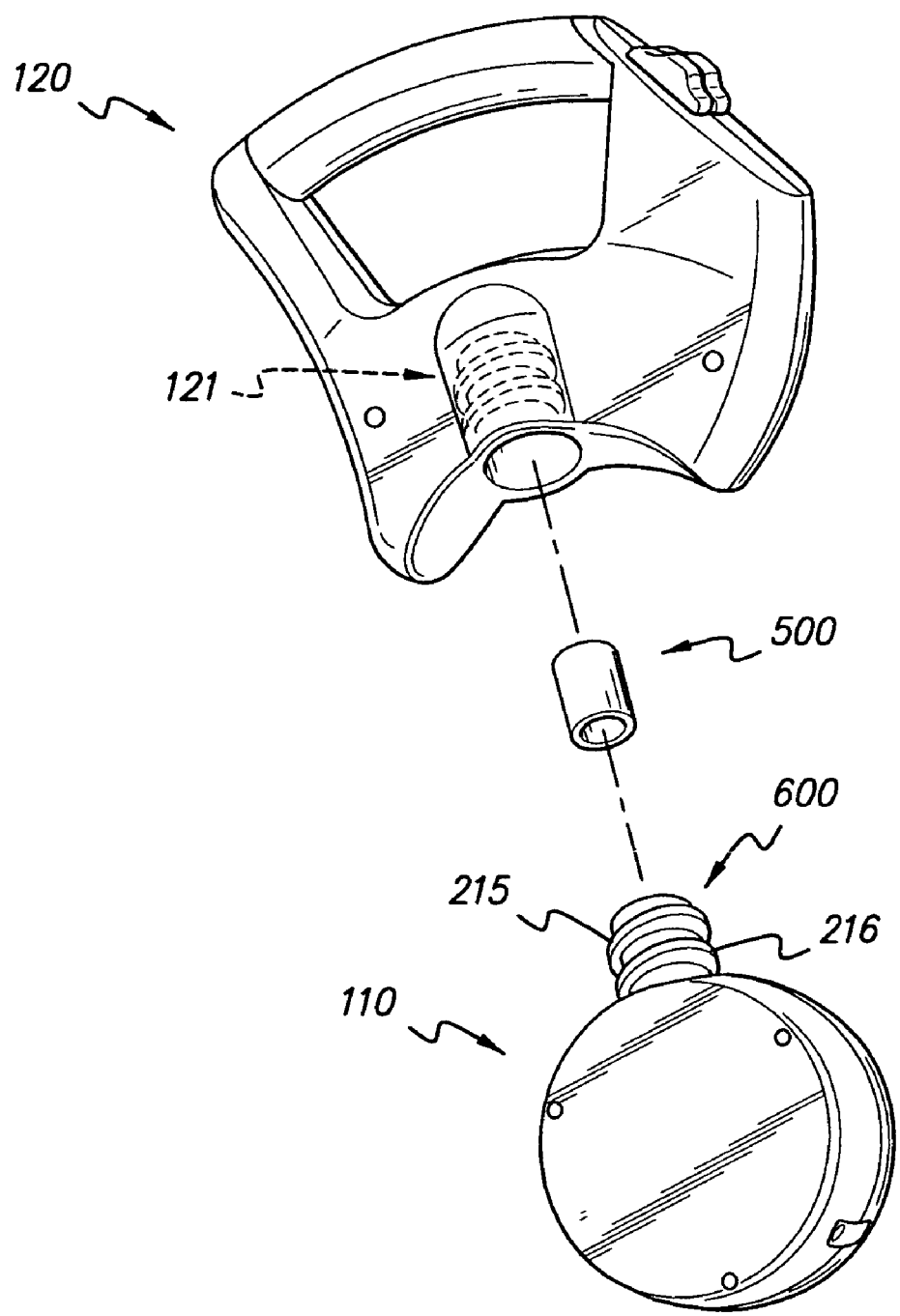
FIG. 10 is a schematic exploded view of the main elements of the present invention.

FIG. 10 is a schematic exploded view of the main elements of the present invention. The reel portion 110 is shown having an extending portion 215 which has ribs 216 and a beating 600 thereon. More than one bearing can be used, and more ribs could be provided; further, the beating member can be omitted although this may increase the frictional resistance against rotation between the parts. The braking mechanism 500 is shown, and it fits partially within a recess 121 formed in the handle portion 120 and partially within the interior of the extending portion 215. The ribs 216 and bearing 600 fit within recessed grooves (shown in dashed outline in FIG. 10) in the handle portion 120.

Figure 11:
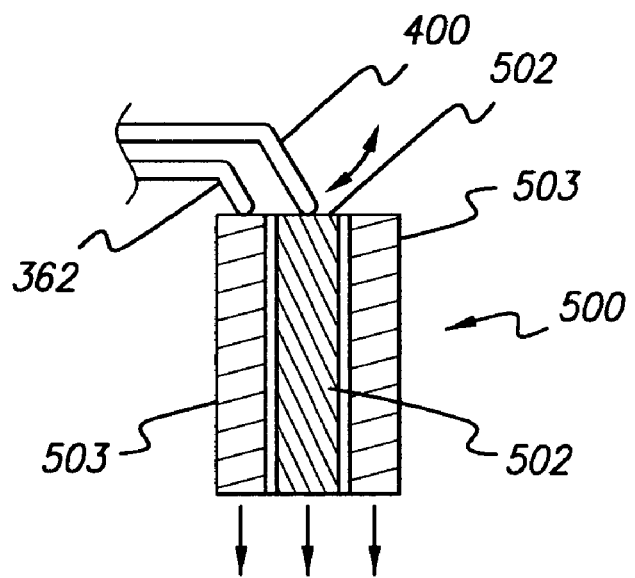
FIG. 11 is an enlarged schematic view showing a section of the stopping mechanism being engaged by two key elements.

FIG. 11 is an enlarged schematic view showing a section of the stopping mechanism 500 being engaged by two key elements 362 and 400. The elements are as discussed hereinabove, and are shown in this simplified diagram for the sake of clarity. The distal portions of the braking mechanism have been omitted for the sake of clarity.

FIG. 12 is a schematic view as seen from the bottom of FIG. 11. This shows the central cylindrical portion 502 and the outer annular portion 503. The dashed outlined elements 362 and 400 show that these elements do not interfere with each other during relative rotation with respect to the members 502 and 503, and the elements 362 and 400 are in sliding engagement therewith regardless of the rotational direction of motion of the braking mechanism 500.

While the pins, connections, and support structures shown are exemplary, the present invention is not limited thereto. While specific supports are shown, other types can be used, so long as the range of position and the starting and ending positions of the braking mechanism are substantially the same. Also, various resistance elements and spring elements can be used, as would be known in the leash arts and in the reel arts. The support members can be guided in other ways, such as by other types of linkages, or can be connected in other ways as would be implemented by anyone having skill in the reeling and manufacturing arts. All such variations and embodiments are contemplated as being within the scope of the present invention.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A dual retractable pet leash with dual leashes having the capability to stop the dual leashes individually while preventing tangling of the dual leashes, comprising:

a handle portion adapted to be held by one hand of a user; said handle portion supporting two manually-operable triggers for selective manual actuation;

a reel portion having a casing, a first reel having a first leash, and a second reel having a second leash; and wherein said casing encloses said two reels;

a braking mechanism having a bearing having an axis of rotation, said bearing being connected between said handle portion and said reel portion, and said bearing providing rotatable support between said handle portion and said reel portion such that said handle portion and said reel portion rotate independently of each other about said axis of said bearing;

said reel portion housing said two reels and supporting said two reels for independent rotation about a first axis, said first leash being retractably mounted on said first reel, and said second leash being retractably mounted on said second reel; said casing of said reel portion enclosing said two reels being rotatable relative to said handle portion when said handle portion is stationary and gripped by a user;

handle portion being connected rotatably to the reel portion via said bearing, so as to permit rotation of said reel portion while said handle portion is being held by a user, so that tangling of said first and second leashes is prevented;

said braking mechanism being carried by said reel portion mounted for rotation with one of said reel portion and said handle portion, for independent selective braking engagement with either selected one of said first and second reels; and a trigger mechanism carried by said handle portion for actuating said braking mechanism, said trigger mechanism having two manually actuatable elements for selective manual actuation of said braking mechanism, for selectively causing braking of either one of said first and second leashes; and said reel portion being independently rotatable relative to said trigger mechanism;

whereby a user can actuate said braking mechanism while said handle portion is held stationary in the grip of the user, while the reel portion rotates freely in response to pulling on either of said first and second leashes so that tangling of said first and second leashes is prevented.

2. The dual retractable pet leash of claim 1, wherein one of the manually actuatable elements is color coded to match the corresponding one of the leashes which can be braked by the actuation by said one of the manually actuatable elements; and wherein the other one of the manually actuatable elements is color coded with a different color to match the corresponding other one of the leashes which can be braked by the actuation by said other one of the manually actuatable elements.

* * * * *